United States Patent
McDonald et al.

(10) Patent No.: US 9,847,949 B1
(45) Date of Patent: Dec. 19, 2017

(54) ARBITRATING DATA PACKETS

(71) Applicant: Hewlett Packard Enterprise Development LP, Houston, TX (US)

(72) Inventors: Nicholas George McDonald, Ft. Collins, CO (US); Al Davis, Coalville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/461,933

(22) Filed: Mar. 17, 2017

(51) Int. Cl.
| | |
|---|---|
| *H04L 12/801* | (2013.01) |
| *H04L 12/863* | (2013.01) |
| *H04L 12/823* | (2013.01) |
| *H04L 12/807* | (2013.01) |
| *H04L 12/26* | (2006.01) |
| *H04L 12/933* | (2013.01) |

(52) U.S. Cl.
CPC .............. *H04L 47/39* (2013.01); *H04L 43/16* (2013.01); *H04L 47/27* (2013.01); *H04L 47/32* (2013.01); *H04L 47/6255* (2013.01); *H04L 49/101* (2013.01)

(58) Field of Classification Search
None
See application file for complete search history.

(56) References Cited

U.S. PATENT DOCUMENTS

| | | | | |
|---|---|---|---|---|
| 6,856,622 | B1* | 2/2005 | Calamvokis | H04L 12/18 370/390 |
| 6,895,015 | B1* | 5/2005 | Chiang | H04L 47/522 370/429 |
| 7,827,325 | B2 | 11/2010 | Alar et al. | |
| 8,228,797 | B1* | 7/2012 | Utley | H04L 47/10 370/235 |
| 2009/0086747 | A1* | 4/2009 | Naven | H04L 47/52 370/412 |
| 2014/0022895 | A1* | 1/2014 | Matthews | H04L 47/12 370/230 |
| 2014/0269294 | A1 | 9/2014 | Morandin et al. | |
| 2014/0307555 | A1 | 10/2014 | DeCusatis et al. | |

OTHER PUBLICATIONS

Minkenberg, C. et al., Speculative Flow Control for High-radix Datacenter Interconnect Routers, (Research Paper), 2007, 10 Pgs.

* cited by examiner

*Primary Examiner* — Hong Cho
(74) *Attorney, Agent, or Firm* — Hewlett Packard Enterprise Patent Department (57) ABSTRACT

Examples disclosed herein relate to receiving, by a scheduler, a request for a window during which to send a data packet through a crossbar. Transmission of the data packet is dependent upon a pool of transmission credits. The scheduler determines whether the pool of transmission credits is sufficient for transmitting the data packet, and when it is determined that the pool of transmission credits is insufficient, the scheduler determines whether to block the request or to speculatively arbitrate the window based on a value of a speculative request counter.

20 Claims, 7 Drawing Sheets

ARBITRATING DATA PACKETS

BACKGROUND

Network switches, network routers, storage switches, memory controllers, bus controllers, and other routing devices receive data at a set of ingress ports and transmit the data at a set of egress ports. Switching circuitry within the device carries each data packet from its ingress port to its egress port based on the data packet's eventual destination. This switching circuitry may take many forms and in some examples, it may include a crossbar, which is a structure with a set of switches arranged in a matrix such that each ingress port is coupled to each egress port by a switch. By activating a given switch, a data packet is carried from the ingress port to the corresponding egress port. The crossbar or other switching circuitry may have a limit on the number of data packets that may be routed concurrently, and to avoid conflicts, each packet may be allotted a window of time to be sent over the switching circuitry.

BRIEF DESCRIPTION OF THE DRAWINGS

Certain examples are described in the following detailed description with reference to the drawings, of which.

Throughout the drawings, identical reference numbers may designate similar, but not necessarily identical elements.

DETAILED DESCRIPTION OF SPECIFIC EXAMPLES

A communication device such as a network switch, a network router, a Serial Attached SCSI (SAS) switch, a memory controller, a bus controller, and/or other suitable device may route data packets between ingress ports and egress ports. A switching circuit carries the data packets from their ingress ports to their egress ports and may take many forms. In some examples, the switching circuit may include a crossbar for this purpose. Irrespective of type, the switching circuit may have a limit on the number of packets that can be routed concurrently, and accordingly, the communication device may include a scheduler to allocate a window of time for sending a data packet through the switching circuit.

In some examples, packets are held at the communication device until a downstream device indicates it has the capacity (e.g., buffer space) to receive the data packet. Various mechanisms may be used to manage downstream capacity, and in some such examples, the communication device tracks capacity of a downstream device using a pool of transmission credits that represent downstream capacity. The communication device may delay sending a data packet to the downstream device when insufficient credits are available in the pool. Because transmission credits may become available as the upstream communication device performs arbitration, switching, and other tasks, it may be advantageous to begin some processing of a data packet before sufficient transmission credits are available.

For this reason and others, in some examples, the communication device may begin to arbitrate a window for the data packet to enter the switching circuit even when the number of transmission credits is insufficient for transmitting the data packet on to the downstream device. The communication device speculates that sufficient transmission credits will exist at the window of time when the data packet is due to be sent through the switching circuit. However, speculatively arbitrating too many data packets may cause the switching circuit to be underutilized when scheduled windows go unused due to insufficient available transmission credits. Accordingly, in some examples, the communication device may include speculative request counters to track and limit the number of data packets being speculatively arbitrated when the transmission credits are insufficient. To track the number of speculative requests currently being arbitrated in the scheduler pipeline, a speculative request counter is adjusted each time arbitration begins on such a data packet and adjusted in the opposite direction each time speculative arbitration of a data packet ends.

Furthermore, the speculative request counters may be tuned based on the switching circuit's ability to handle a workload. In some such examples, the speculative request counter is adjusted to permit fewer data packets to be speculatively arbitrated if the switching circuit stalls too often or adjusted to permit more data packets to be speculatively arbitrated if the switching circuit is underutilized.

By these mechanisms and others, the present disclosure provides substantial real-world improvements to data switching and arbitration. For instance in many examples, by arbitrating a data packet's entry to the switching circuit even before the number of transmission credits is sufficient for entering the switching circuit, the time a data packet sits idle decreases and the throughput of the communication device increases. In some examples, the use of separate speculative request counters for each ingress port prevents a busy port from monopolizing the switching circuit. In some examples, the use of a tunable speculative request counter permits the number of speculatively arbitrated packets to be adjusted to optimize the capacity of the switching circuit.

These examples and others are described with reference to the following figures. Unless noted otherwise, the figures and their accompanying description are non-limiting, and no element is characteristic of any particular example. In this regard, features from one example may be freely incorporated into other examples without departing from the spirit and scope of the disclosure.

Figure 1:
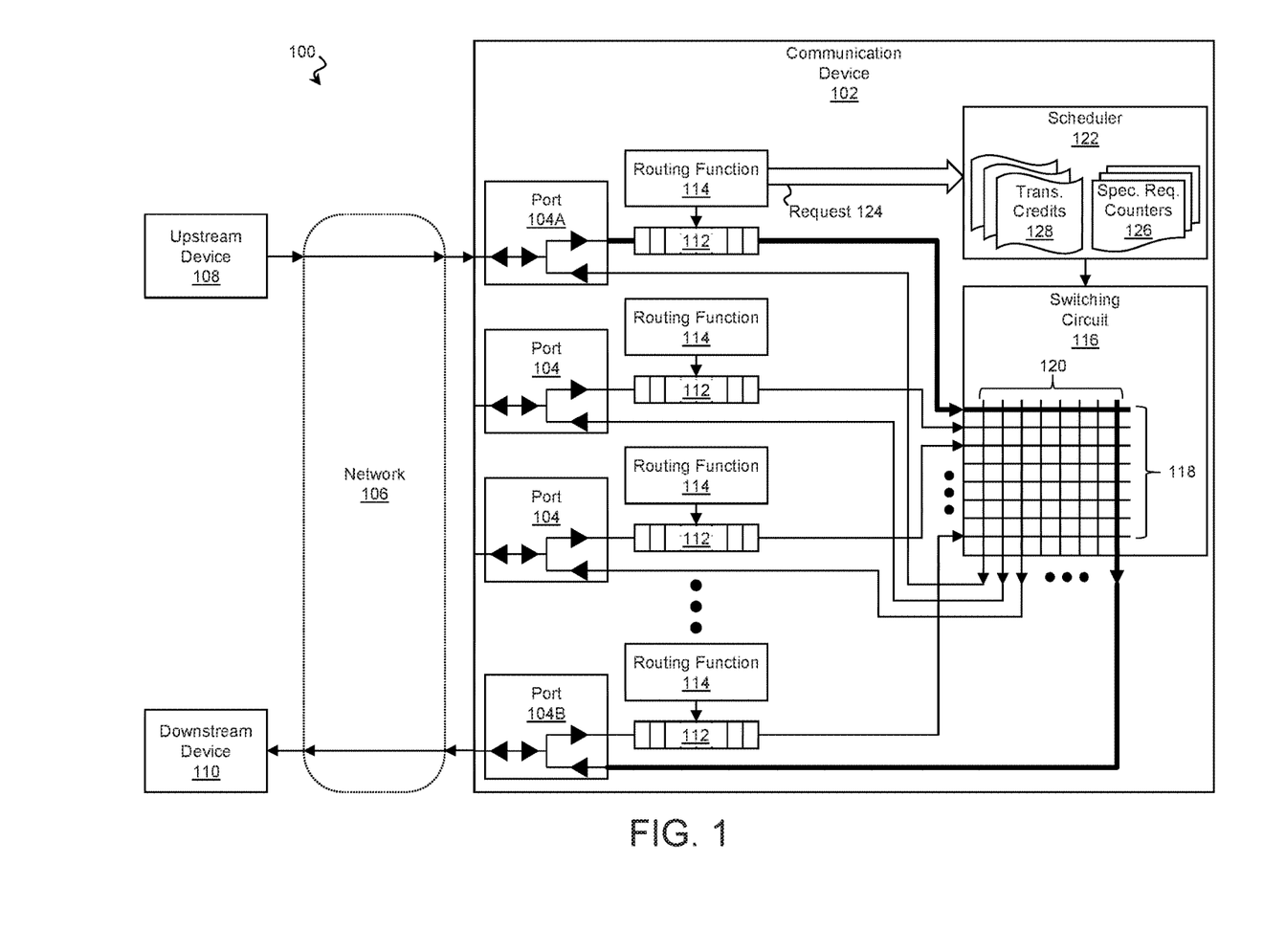
FIG. 1 is a block diagram of a computing environment according to some examples of the present disclosure.

A computing environment for practicing the technique of the present disclosure is described with reference to FIG. 1. In that regard, FIG. 1 is a block diagram of a computing environment 100 according to some examples of the present disclosure. The computing environment includes a communication device 102 such as a network switch, a network router, a Serial Attached SCSI (SAS) switch, a memory controller, a bus controller, and/or other communication device. The communication device 102 includes a plurality of ports 104 for sending and receiving data over a network 106. The communication device 102 may include any number of ports 104, including ports 104A and 104B, a subset of which are illustrated in FIG. 1. The network 106 to which the ports 104 are coupled may have any degree of complexity and may range from a single wire to a heterogeneous network of switches, routers, and other network devices spread across the world. The communication device 102, ports 104, and network 106 may support any suitable wired or wireless communication protocol including Ethernet, IEEE 802.11 WiFi, Fibre Channel, and/or other suitable protocols and may support any suitable data format.

In an example, the ports 104 of the communication device 102 are communicatively coupled to upstream devices 108 that send data packets to the communication device 102 and downstream devices 110 that receive data packets from the communication device 102. The upstream devices 108 and the downstream devices 110 may be substantially similar to communication device 102 and/or may include any other suitable network or computing devices. A given device may be an upstream device 108 for some data packets and a downstream device 110 for other data packets.

The communication device 102 directs data packets between entities, including the upstream devices 108 and the downstream devices 110, and may include receive buffers 112 for the ports 104 to store incoming data packets. In an example, the communication device 102 receives a data packet from the upstream device 108 at a first port 104 designated as an ingress port 104A and stores the data packet in the receive buffer 112 for the ingress port 104A. The data packet is intended for routing to a downstream device 110 communicatively coupled to a second port 104 designated as an egress port 104B. As the communication device 102 may be coupled to multiple upstream devices 108 and downstream devices 110, the communication device 102 includes routing functions 114 that determine which port 104 is the egress port 104B for a given data packet based on a destination address within the data packet.

In order to carry the data packet from its ingress port 104A to its egress port 104B, the communication device 102 includes a switching circuit 116. The communication device 102 may include any suitable type of switching circuit 116, and in some examples, the switching circuit 116 includes a crossbar. A crossbar is a circuit device for communicatively coupling lines of a first set of signal lines 118 to lines of a second set of signal lines 120. The first set of signal lines 118 may be arranged in parallel and perpendicular to the second set of signal lines 120 with a switch at the intersection of each line. In an example application, the first set of signal lines 118 are coupled to receive circuitry of the ports 104 and the second set of signal lines 120 are coupled to transmission circuitry of the ports 104. Thus, by activating particular switches, data packets can be directed from their respective ingress ports to their respective egress ports.

While some examples permit an ingress port 104A to be communicatively coupled to more than one egress port 104B concurrently, in many examples, each egress port 104B is only permitted to be coupled to one ingress port 104A concurrently. This and other factors may contribute to a limit on the number of data packets that the crossbar or other switching circuit 116 may service concurrently. To enforce this limit, the communication device 102 may include a scheduler 122, and once an egress port 104B has been identified, the routing function 114 for the ingress port 104A may send a request 124 to the scheduler 122 for a window of time for the data packet to be sent through the switching circuit 116 from the input buffer 112 of the ingress port 104A to the egress port 104B.

The scheduler 112 may receive multiple requests 124 from multiple data packets at each clock cycle, and arbitrate among the requests 124 to determine when each packet may enter the switching circuit 116. The scheduler 112 may use any suitable arbitration technique including round-robin, least recently used, shortest packet first, priority-based techniques, and/or other suitable arbitration techniques to assign windows to the data packets.

Furthermore, to avoid overtaxing the downstream device 110, the communication device 102 may block data packets from entering the switching circuit 116 even when the allotted window arrives based on the available resources of the downstream device 110. For this purpose, in some examples, the communication device 102 allocates a pool of transmission credits 128 to each egress port 104B based on the capacity of the downstream device 110 coupled to the port 104. As data packets are transmitted by the egress port 104B over the network 106, transmission credits 128 are removed from the port's pool, and credits are returned to the pool as the downstream device 110 acknowledges each data packet. In further examples, the communication device 102 uses other techniques to govern the flow of data packets through the switching circuit 116.

In some examples, the scheduler 122 may not begin to arbitrate a window for a data packet to traverse the switching circuit 116 if the egress port 104B lacks sufficient transmission credits 128 for transmission of the packet to the respective downstream device 110, because the packet may be prevented from entering the switching circuit 116 when the window arrives. This may deprive other data packets that have sufficient credits. However, in some such examples, the scheduler 122 begins arbitrating windows for a limited number of such data packets on the speculation that credits will accumulate while the data packet is being arbitrated in order to increase throughput of the communication device 102. Accordingly, the scheduler 122 may include a set of speculative request counters 126, with one counter 126 per ingress port 104A. The speculative request counters 126 are used to track and limit the number of window requests currently being speculatively arbitrated in order to optimize the utilization of the switching circuit 116.

In an example, when the scheduler 122 receives a request 124 for a window for a data packet, the scheduler 122 determines whether the pool of transmission credits 128 for the egress port 104B has sufficient credits to transmit the data packet over the network 106. If so, the scheduler 122 begins arbitrating a window for the data packet according to a suitable arbitration technique (e.g., round-robin, least recently used, shortest packet first, priority, etc.). If the egress port 104B currently lacks sufficient credits, the scheduler 122 determines from the speculative request counter 126 of the ingress port 104A whether the current data packet will exceed a threshold for speculatively arbitrated data packets. Request counters 126 may count up with each speculatively arbitrated data packet until a threshold is reached, may count down from a starting value until zero or another threshold is reached, or use any other suitable counting technique.

When the speculative request counter 126 of the egress port 104B and ingress port 104A indicates that the current data packet will not exceed the threshold for speculatively arbitrated data packets, the scheduler 122 adjusts (e.g., increments or decrements) the speculative request counter 126, and begins arbitrating a window for the data packet.

When the window is successfully arbitrated, the scheduler 122 adjusts (e.g., decrements or increments) the speculative request counter 126 in an opposite manner.

Conversely, if the current data packet would exceed the threshold for speculatively arbitrated data packets, the request 124 is blocked until further transmission credits 128 are received or other speculative requests complete and the speculative request counter 126 changes.

By speculatively arbitrating a limited number of data packets, arbitration throughput can be increased without significantly increasing the number of windows in which data packets are blocked from entering the switching circuit 116 due to insufficient transmission credits 128.

In some examples, the scheduler 122 adjusts the thresholds of the speculative request counters 126 to perform less speculative arbitration if the number of data packets blocked from the switching circuit 116 exceeds an upper threshold or to perform more speculative arbitration if the number of blocked data packets falls below a lower threshold.

Figure 2:
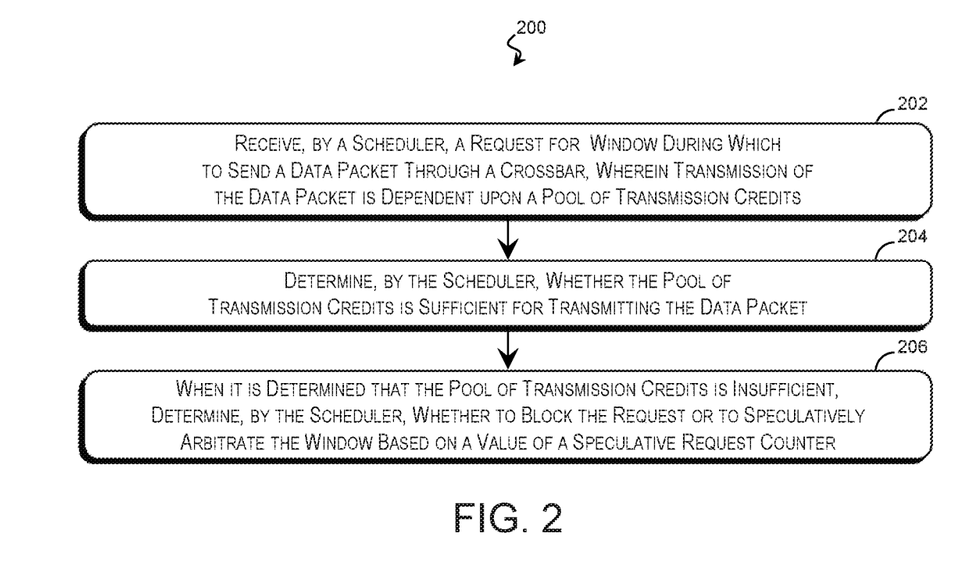
FIG. 2 is a flow diagram of a method of speculatively arbitrating a window for a data packet according to some examples of the present disclosure.
Figure 3:
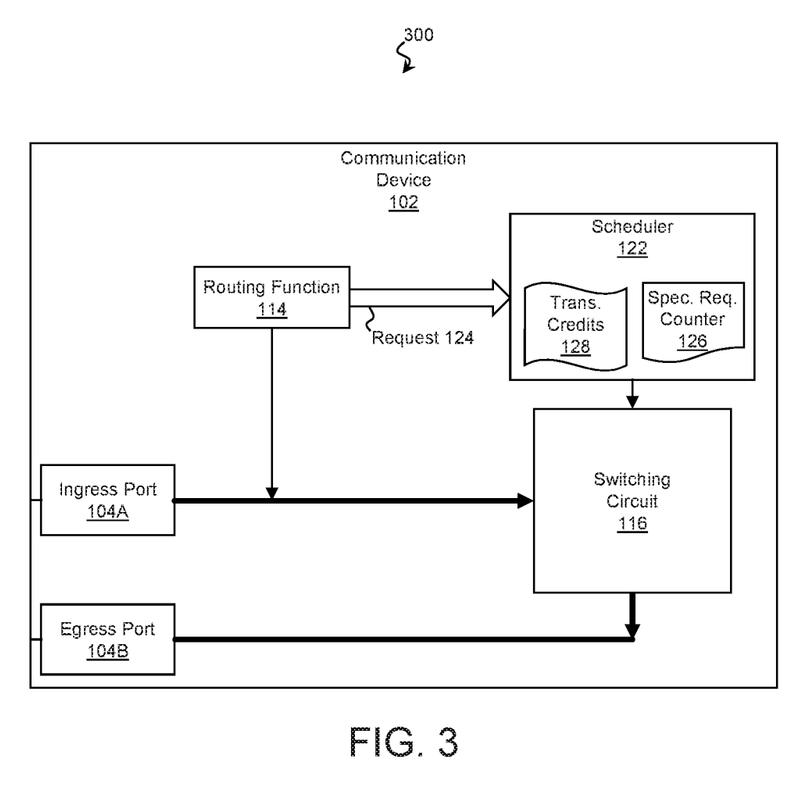
FIG. 3 is a block diagram of a computing environment performing a method of speculatively arbitrating a window for a data packet according to some examples of the present disclosure.

Examples of speculative arbitrating windows for data packets are described with reference to FIGS. 2 and 3. In that regard, FIG. 2 is a flow diagram of a method 200 of speculatively arbitrating a window for a data packet according to some examples of the present disclosure. The description of the method 200 is non-limiting, and steps may be added to and omitted from the method 200 without departing from the disclosure. Furthermore, unless noted otherwise, processes of the method 200 may be performed in any order including being performed concurrently by one or more entities. FIG. 3 is a block diagram of a computing environment 300 performing the method 200 of speculatively arbitrating a window for a data packet according to some examples of the present disclosure.

The computing environment 300 may include a communication device 102 substantially similar to that of FIG. 1 in many regards. For example, the communication device 102 may include an ingress port 104A and an egress port 104B communicatively coupled by a crossbar or other switching circuit 116. A pool of transmission credits 128 may be allocated to the egress port 104B based on the capacity of a downstream device coupled to the egress port 104B to receive new data packets. As data packets are transmitted by the egress port 104B over the network 106, transmission credits 128 are removed from the pool, and credits 128 are returned to the pool when the downstream entity acknowledges each data packet. In order to control the flow of data packets, in some examples, the communication device 102 prevents data packets from entering the crossbar or other switching circuit 116 when the egress port 104B does not have sufficient transmission credits 128 in the respective pool to transmit the data packet.

Referring to block 202 of FIG. 2 and to FIG. 3, a scheduler 122 of a communication device 102 receives a request 124 for a window during which to send a data packet through the crossbar or other switching circuit 116 from the ingress port 104A to the egress port 104B. Transmission of the data packet by the egress port 104B may depend on a pool of transmission credits 128.

Referring to block 204 of FIG. 2, the scheduler 122 determines whether the pool of transmission credits 128 is sufficient for transmitting the data packet.

Referring to block 206 of FIG. 2 and to FIG. 3, if the pool of transmission credits 128 is insufficient, the scheduler 122 determines whether to block the request or to speculatively begin arbitration of the window based on a value of a speculative request counter 126 associated with the ingress port 104A.

Further examples of the technique are described with reference to FIGS. 4A and 4B, which are flow diagrams of a method 400 of speculative arbitration according to some examples of the present disclosure. The description of the method 400 is non-limiting, and steps may be added to and omitted from the method 400 without departing from the disclosure. Furthermore, unless noted otherwise, processes of the method 400 may be performed in any order including being performed concurrently by one or more entities.

Figure 4A:
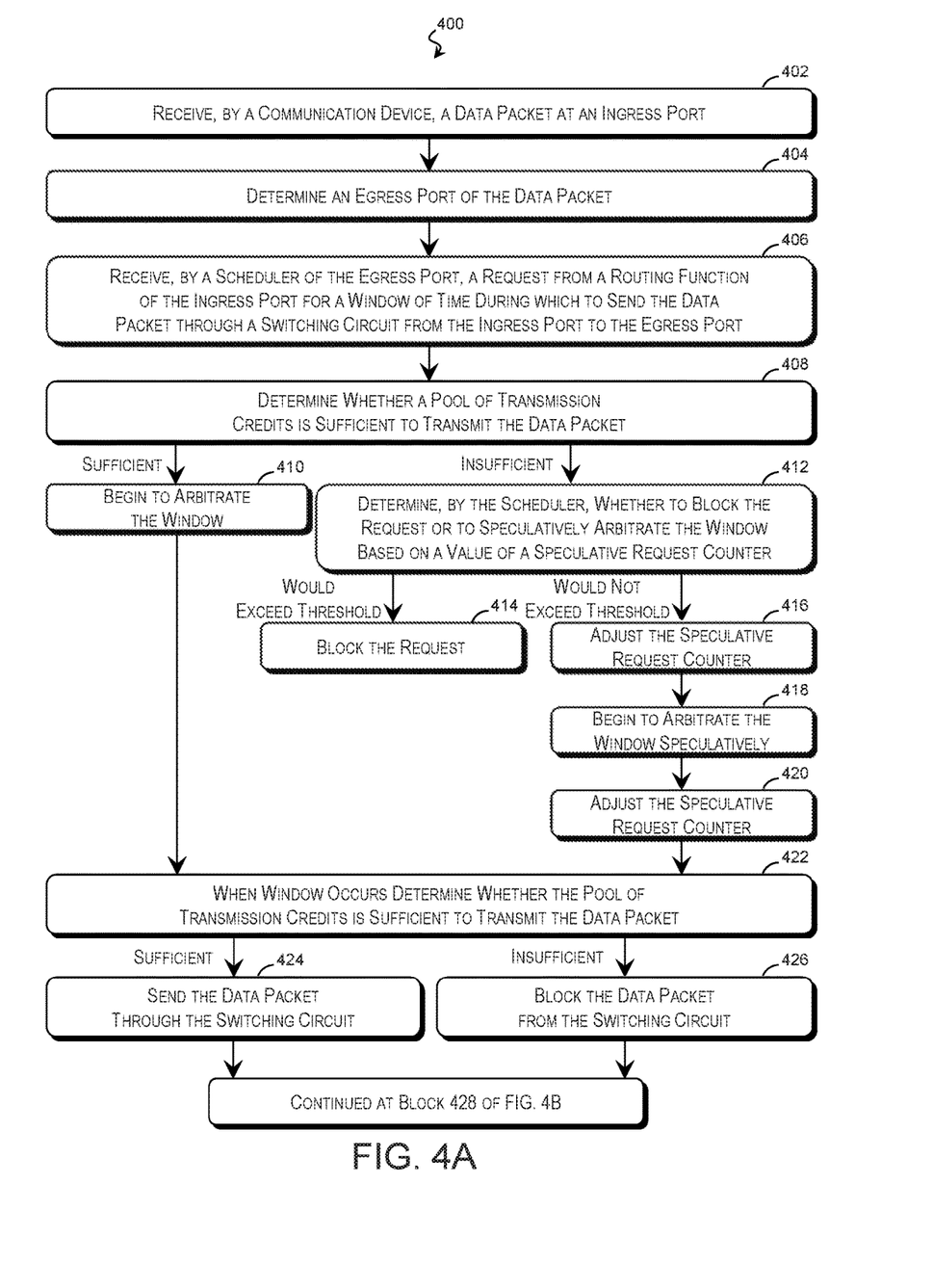
FIGS. 4A and 4B are flow diagrams of a method of speculative arbitration according to some examples of the present disclosure.
Figure 4B:
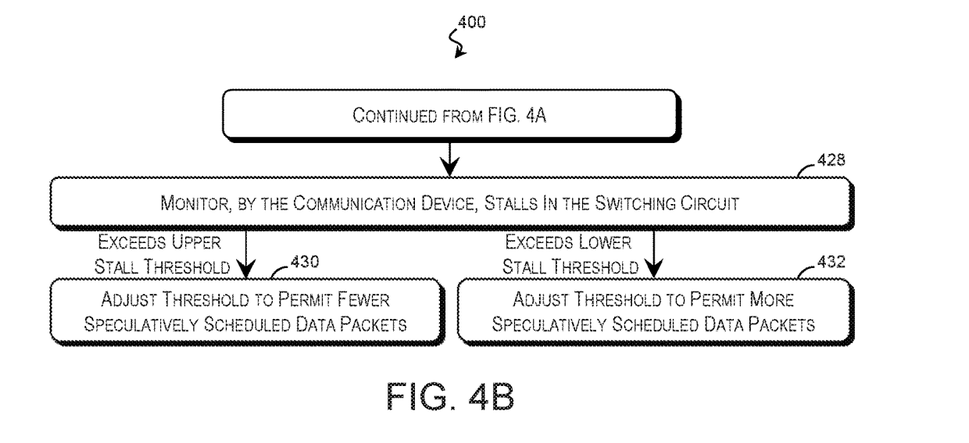

Referring to block 402 of FIG. 4A, a communication device 102 receives a data packet at an ingress port 104A of the communication device 102. Referring to block 404, the communication device 102 determines which port 104 of the communication device 102 to use as the egress port 104B of the data packet. For example, a routing function 114 of the communication device 102 may determine the egress port 104B of the data packet based on the packet's destination address.

Referring to block 406, a scheduler 122 of the egress port 104B receives a request 124 from the routing function 114 of the ingress port 104A for a window of time during which to send the data packet through a switching circuit 116 from the ingress port 104A to the egress port 104B. This may be performed substantially as described in block 202 of FIG. 2. Referring to block 408, the scheduler 122 determines whether the egress port 104B has a pool of transmission credits 128 sufficient to transmit the data packet out of the egress port 104B. This may be performed substantially as described in block 204 of FIG. 2. If sufficient transmission credits 128 exist, the scheduler 122 begins arbitrating the window for the data packet as indicated by block 410. The scheduler 122 may use any suitable technique to arbitrate the window for the data packet such as round-robin, least recently used, shortest packet first, priority-based techniques, and/or other suitable techniques.

Conversely, if the scheduler 122 determines that the pool of transmission credits 128 is insufficient, the scheduler 122 determines whether to begin arbitrating the data packet upon the speculation that the transmission credits 128 will arrive before the window occurs. To that end, the scheduler 122 may refer to a speculative request counter 126 assigned to the particular ingress port 104A. Referring to block 412, the scheduler determines whether to block the request or to speculatively arbitrate the window based on the value of the speculative request counter 126. This may be performed substantially as described in block 206 of FIG. 2. In some examples, the scheduler 122 determines whether to block the request 124 or to begin arbitrating the window based on a comparison of the value of the speculative request counter 126 to a threshold. The request counter 126 may count up with each speculatively arbitrated data packet until the threshold is reached, may count down from a starting value until zero or another threshold is reached, or use any other suitable counting technique.

If the comparison indicates that arbitrating the window would exceed the threshold, the request is blocked until additional transmission credits 128 are received or the speculative request counter 126 changes, as shown in block 414.

However, if scheduler determines from the comparison of block 412 that arbitrating the window speculatively would not exceed the threshold, the scheduler 122 increments or decrements the speculative request counter 126 based on the operation of the counter 126 as shown in block 416. After adjusting the speculative request counter 126, the scheduler 122 begins to speculatively arbitrate the window for the data packet in block 418. This may be performed substantially similar to the arbitration in block 410. Referring to block 420, once the window is arbitrated, the scheduler 122 adjusts the counter 126 opposite the adjustment of block 416 to free up a speculative arbitration opportunity.

Referring to block 422, when the window for sending the data packet through the switching circuit 116 occurs, the communication device 102 determines whether the data packet has sufficient transmission credits 128 to transmit the data packet over the network 106 prior to providing the data packet to the switching circuit 116. As the pool of transmission credits 128 is dynamic, the determination of block 422 may be different from the determination of block 408, and a data packet determined not to have sufficient credits in block 408 may have sufficient credits by the time block 422 occurs.

If the communication device 102 determines that the data packet has sufficient transmission credits 128, the data packet is sent to the switching circuit 116 in block 424 and thereby provided to the egress port 104B for transmission over the network 106. In contrast, if the communication device 102 determines that the data packet does not have sufficient transmission credits 128, the data packet is blocked from entering the switching circuit 116 in block 426.

The thresholds for determining whether to speculatively arbitrate data packets may be fine-tuned to optimize scheduler throughput and utilization of the switching circuit 116. In some examples, the arbitration performed in blocks 410 and/or 418 is a pipelined process that occurs over a number of clock cycles. Accordingly, the threshold of block 412 may be a function of the pipeline depth of the scheduler 122 (e.g., half the number of pipeline stages, one quarter of the number of pipeline stages, etc.).

The pipeline depth may also be used as an initial starting value of the threshold, and the threshold may be adjusted based on real-world behavior of the scheduler 122 and switching circuit 116. Referring to block 428 of FIG. 4B, the communication device 102 monitors stalls in the switching circuit 116 such as windows when the respective data packet is blocked from the switching circuit 116. Stalls may be caused by insufficient transmission credits 128 as well as other conflicts. Referring to block 430, the thresholds for the speculative request counters 126 may be adjusted to permit fewer data packets to be speculatively arbitrated if the stall rate exceeds an upper stall threshold. Referring to block 432, the thresholds may be adjusted to permit more data packets to be speculatively arbitrated if the stall rate falls below a lower stall threshold, for example, if an extended period of time elapses without a stall.

Figure 5:
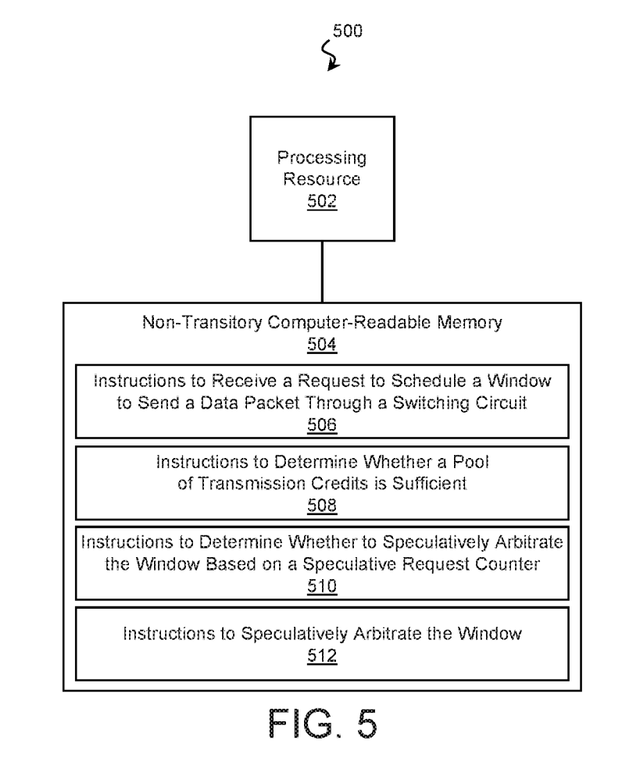
FIG. 5 is a block diagram of a computing system including a non-transitory computer-readable memory resource for speculative arbitration of packet switching according to some examples of the present disclosure.

The processes of methods 200 and 400 may be performed by any combination of hard-coded and programmable logic. In some examples, a processing resource utilizes instructions stored on a non-transitory computer-readable memory resource to perform at least some of these processes. Accordingly, examples of the present disclosure may take the form of a non-transitory computer-readable memory resource storing instructions that perform at least part of methods 200 and/or 400. FIG. 5 is a block diagram of a computing system 500 including a non-transitory computer-readable memory resource for speculative arbitration of packet switching according to some examples of the present disclosure.

The computing system 500 includes a processing resource 502 communicatively coupled to the non-transitory computer-readable memory resource 504. The processing resource 502 may include any number and combination of CPUs, GPUs, microcontrollers, ASICs, FPGAs, and/or other processing resources, and the non-transitory computer-readable memory resource 504 may include any suitable non-transitory memory device or devices including HDDs, SSDs, other flash memory devices, optical media, battery-backed RAM, ROM, and/or other memory devices suitable for storing instructions for the processing resource 502. Accordingly, in various examples, the non-transitory computer-readable memory resource 504 stores instructions for performing processes of method 200 and/or method 400.

For example, referring to block 506, the non-transitory computer-readable memory resource 504 may store instructions that cause the processing resource 502 to receive a request for a window during which to send a data packet through a switching circuit 116 from an ingress port 104A to an egress port 104B. This may be performed substantially as described in block 202 of FIG. 2 and/or block 406 of FIG. 4.

Referring to block 508, the non-transitory computer-readable memory resource 504 may store instructions that cause the processing resource 502 to determine whether a pool of transmission credits 128 is sufficient to transmit the data packet by the egress port 104B. This may be performed substantially as described in block 204 of FIG. 2 and/or block 408 of FIG. 4.

Referring to block 510, the non-transitory computer-readable memory resource 504 may store instructions that cause the processing resource 502 to, when the pool of transmission credits 128 is not sufficient to transmit the data packet, determine whether to speculatively arbitrate the window based on a comparison of a speculative request counter 126 to a threshold. The threshold may be based on a scheduler pipeline depth. This may be performed substantially as described in block 206 of FIG. 2 and/or block 412 of FIG. 4.

Referring to block 512, the non-transitory computer-readable memory resource 504 may store instructions that cause the processing resource 502 to, when it is determined to speculatively arbitrate the window, speculatively arbitrate the window to send the data packet through the switching circuit. This may be performed substantially as described in blocks 410 and/or 418 of FIG. 4.

Figure 6:
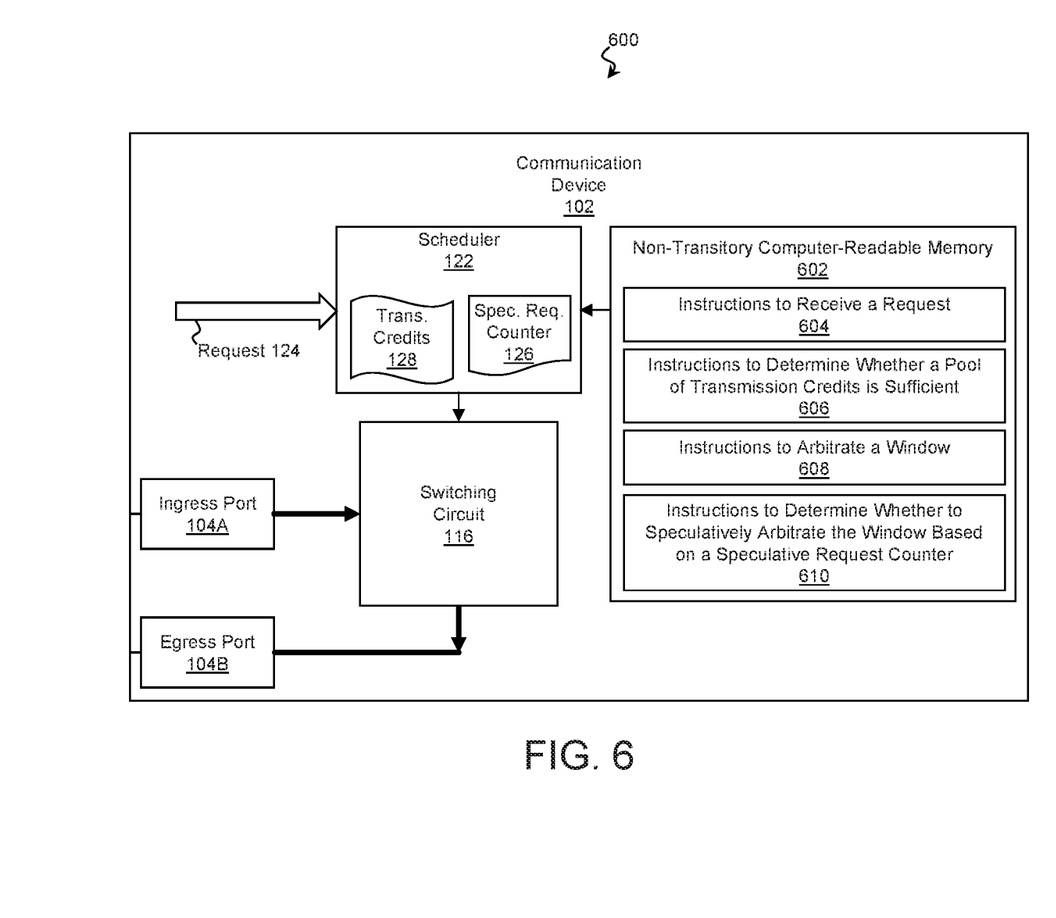
FIG. 6 is a block diagram of a computing environment for processing data packets according to some examples of the present disclosure.

FIG. 6 is a block diagram of a computing environment 600 for processing data packets according to some examples of the present disclosure. The computing environment 600 includes a communication device 102 and a network, each substantially similar to those of FIG. 1 in many regards. For example, the communication device 102 includes an ingress port 104A at which to receive a data packet, an egress port 104B to transmit the data packet over the network 106, and a switching circuit 116 to route the data packet from the ingress port 104A to the egress port 104B. The communication device 102 may also include a scheduler 122 in communication with a non-transitory computer-readable memory resource 602 that stores instructions that, when executed, cause the scheduler 122 to perform the processes of method 200 and/or method 400. The non-transitory computer-readable memory resource 602 may include any suitable non-transitory memory device or devices including HDDs, SSDs, other flash memory devices, optical media, battery-backed RAM, ROM, and/or other memory devices suitable for storing the instructions.

Referring to block 604, in some such examples, the instructions cause the scheduler 122 to receive a request for a window during which to send the data packet through the switching circuit 116. This may be performed substantially as described in block 202 of FIG. 2 and/or block 406 of FIG. 4.

Referring to block 606, in some such examples, the instructions cause the scheduler 122 to determine whether a pool of transmission credits 128 is sufficient to transmit the data packet by the egress port 104B. This may be performed substantially as described in block 204 of FIG. 2 and/or block 408 of FIG. 4.

Referring to block 608, in some such examples, the instructions cause the scheduler 122 to arbitrate a window for the data packet to be sent through the switching circuit 116 when the pool of transmission credits is sufficient to transmit the data packet over the network 106. This may be performed substantially as described in block 410 of FIG. 4. In contrast, referring to block 610, when it is determined that the data packet does not have sufficient transmission credits, the instructions may cause the scheduler 122 to determine whether to block the request or to speculatively arbitrate the window based on a speculative request counter 126 associated with the ingress port 104A and the egress port 104B. This may be performed substantially as described in block 206 of FIG. 2 and/or blocks 412 and 416-420 of FIG. 4.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a scheduler, a request for a window during which to send a data packet through a crossbar, wherein transmission of the data packet is dependent upon a pool of transmission credits;
   determining, by the scheduler, whether the pool of transmission credits is sufficient for transmitting the data packet; and
   when it is determined that the pool of transmission credits is insufficient:
      determining, by the scheduler, whether to block the request or to speculatively arbitrate the window based on a value of a speculative request counter.

2. The method of claim 1, wherein the speculative request counter is associated with an ingress port at which the data packet is received.

3. The method of claim 1, comprising: when it is determined to speculatively arbitrate the window:
   during the window for sending the data packet through the crossbar:
      determining whether the pool of transmission credits has become sufficient for transmitting the data packet; and
      when it is determined that the pool of transmission credits has not become sufficient for transmitting the data packet, preventing the data packet from entering the crossbar.

4. The method of claim 1, comprising: when it is determined to speculatively arbitrate the window:
   performing a first action from a group consisting of incrementing the speculative request counter and decrementing the speculative request counter; and
   thereafter, speculatively arbitrating the window, by the scheduler.

5. The method of claim 4, comprising: when it is determined to speculatively arbitrate the window:
   performing a second action from the group consisting of incrementing the speculative request counter and decrementing the speculative request counter that is opposite the first action after the speculatively arbitrating of the window.

6. The method of claim 1,
   wherein the determining of whether to block the request or to speculatively arbitrate the window is based on a comparison of the value of the speculative request counter to a threshold, and
   wherein the threshold is based on a pipeline depth of the scheduler.

7. The method of claim 1, wherein the determining of whether to block the request or to speculatively arbitrate the window is based on a comparison of the value of the speculative request counter to a threshold, the method further comprising adjusting the threshold to permit fewer speculatively scheduled data packets when a stall rate of the crossbar exceeds an upper stall threshold.

8. The method of claim 1, wherein the determining of whether to block the request or to speculatively arbitrate the window is based on a comparison of the value of the speculative request counter to a threshold, the method further comprising adjusting the threshold to permit more speculatively scheduled data packets when a stall rate of the crossbar falls below a lower stall threshold.

9. A non-transitory computer-readable memory resource storing instructions that, when executed, cause a processing resource to:
   receive a request for a window during which to send a data packet through a switching circuit from an ingress port to an egress port;
   determine whether a pool of transmission credits is sufficient to transmit the data packet;
   when the pool of transmission credits is not sufficient to transmit the data packet, determine whether to speculatively arbitrate the window based on a comparison of a speculative request counter to a threshold, wherein the threshold is based on a scheduler pipeline depth; and
   when it is determined to speculatively arbitrate the window, speculatively arbitrate the window to send the data packet through the switching circuit.

10. The non-transitory computer-readable memory resource of claim 9 wherein the switching circuit includes a crossbar.

11. The non-transitory computer-readable memory resource of claim 9, wherein the instructions further cause the processing resource to:
   before the window is speculatively arbitrated, perform a first action from a group consisting of increment the speculative request counter and decrement the speculative request counter.

12. The non-transitory computer-readable memory resource of claim 11, wherein the instructions further cause the processing resource to:
   after the window is speculatively arbitrated, perform a second action from the group consisting of incrementing the speculative request counter and decrementing the speculative request counter that is opposite the first action.

13. The non-transitory computer-readable memory resource of claim 9, wherein the instructions further cause the processing resource to:
   during the window to send the data packet, provide the data packet to the switching circuit or block the data packet from the switching circuit based on whether the pool of transmission credits has become sufficient to transmit the data packet.

14. The non-transitory computer-readable memory resource of claim 9, wherein the instructions further cause the processing resource to:
   adjust the threshold to permit fewer speculatively scheduled data packets when a stall rate of the switching circuit exceeds an upper stall threshold.

15. The non-transitory computer-readable memory resource of claim 14, wherein the instructions further cause the processing resource to:
   adjust the threshold to permit more speculatively scheduled data packets when the stall rate of the switching circuit falls below a lower stall threshold.

16. A system comprising:
   an ingress port to receive a data packet;
   an egress port to transmit the data packet;
   a switching circuit to route the data packet from the ingress port to the egress port; and
   a scheduler in communication with a non-transitory computer-readable memory resource, wherein the non-transitory computer-readable memory resource stores instructions that, when executed, cause the scheduler to:
      receive a request for a window during which to send the data packet through the switching circuit;
      determine whether a pool of transmission credits is sufficient to transmit the data packet;
      when it is determined that the data packet has sufficient transmission credits, arbitrate a window for the data packet to be sent through the switching circuit; and
      when it is determined that the data packet does not have sufficient transmission credits, determine whether to block the request or to speculatively arbitrate the window based on a speculative request counter associated with the ingress port.

17. The system of claim 16, wherein the switching circuit includes a crossbar.

18. The system of claim 16, wherein the instructions further cause the scheduler to:
   determine whether to block the request or to selectively arbitrate the window based on a comparison of the speculative request counter to a threshold that is based on a pipeline depth of the scheduler.

19. The system of claim 18, wherein the instructions further cause the scheduler to:
   adjust the threshold to permit fewer speculatively arbitrated data packets when a stall rate of the switching circuit exceeds an upper stall threshold.

20. The system of claim 18, wherein the instructions further cause the scheduler to:
   adjust the threshold to permit more speculatively arbitrated data packets when a stall rate of the switching circuit falls below a lower stall threshold.

* * * * *